Dec. 20, 1955     L. W. HAERTHER     2,727,372

TORQUE LIMITER

Filed June 29, 1953     3 Sheets-Sheet 1

INVENTOR.
LESTER W. HAERTHER
BY Marvin Moody
ATTORNEY

Dec. 20, 1955   L. W. HAERTHER   2,727,372
TORQUE LIMITER

Filed June 29, 1953   3 Sheets-Sheet 2

INVENTOR.
LESTER W. HAERTHER
BY Marvin Moody
ATTORNEY

Dec. 20, 1955  L. W. HAERTHER  2,727,372
TORQUE LIMITER

Filed June 29, 1953  3 Sheets-Sheet 3

INVENTOR.
LESTER W. HAERTHER
BY Marvin Moody
ATTORNEY

United States Patent Office 2,727,372
Patented Dec. 20, 1955

2,727,372

TORQUE LIMITER

Lester W. Haerther, Cedar Rapids, Iowa, assignor to Collins Radio Company, Cedar Rapids, Iowa, a corporation of Iowa Application June 29, 1953, Serial No. 364,549

13 Claims. (Cl. 64—30)

This invention relates in general to torque limiters and in particular to torque limiters which provide a constant limiting torque regardless of variations in the coefficient of friction of clutch surfaces used therein.

Oftentimes it is necessary to provide a means which will prevent a rotating shaft from transmitting a torque greater than a specified limit. Such means are generally known as torque limiters and have wide application. It is sometimes required that a torque limiter's maximum transmittable torque remain constant over wide operating conditions of temperature and humidity.

One type of torque limiter in common use is a spring biased friction clutch. Its limiting torque depends upon the force applied to the clutch friction surfaces and upon the coefficient of friction of those friction surfaces. Coefficients of friction unfortunately vary with atmospheric variations in temperature and humidity. The clutch type of torque limiter, therefore, has a limiting torque which varies widely with atmospheric change. It is therefore an object of this invention to provide a torque limiter which obtains a specified limiting torque independent of variation in the coefficient of friction of its clutch material.

An example of a torque limiter which particularly undergoes wide atmospheric changes of temperature and humidity is one used in an aircraft's automatic pilot. The Civil Aeronautics Administration requires that the limiting torque for an automatic pilot torque limiter must be maintained virtually constant under all atmospheric conditions. It is therefore the principal object of this invention to provide a torque limiter which obtains a specified limiting torque independent of atmospheric change of temperature and humidity.

This invention consists generally of two series of bearings which operate upon respective inclined surfaces between a compressed spring and friction clutch. A torque greater than the specified limit causes a transverse force which first operates on the first series of bearings and their inclined surfaces until an adjusted amount of lost motion is overcome. The spring force is then shifted to the second set of bearings because of the greater slope of their inclined surfaces and is diverted from the clutch which then slips.

Other objects, features and advantages of this invention will be apparent to a person skilled in the art upon a further study of these specifications and drawings, in which.

Figure 1:
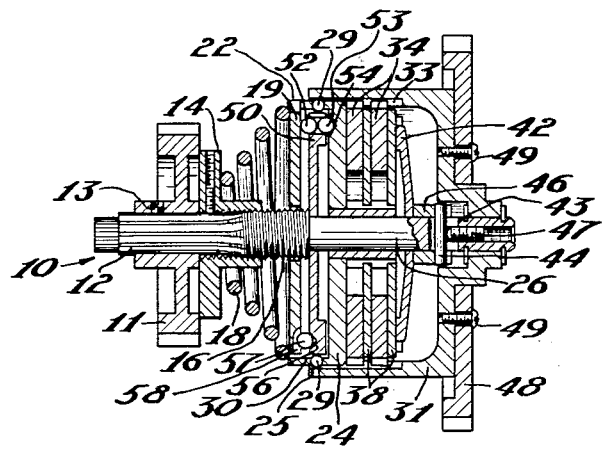
Figure 1 is a half sectional view taken along line 1—1 of Figure 5.
Figure 2:
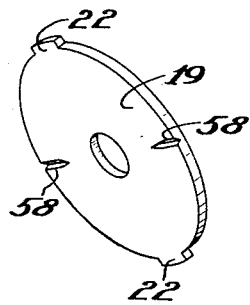
Figure 2 is a perspective view of a part used in the chosen embodiment of this invention.
Figure 3:
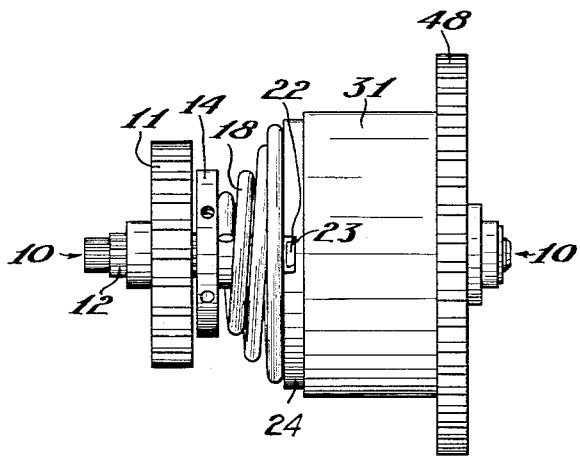
Figure 3 is a side elevational view of this embodiment.
Figure 4:
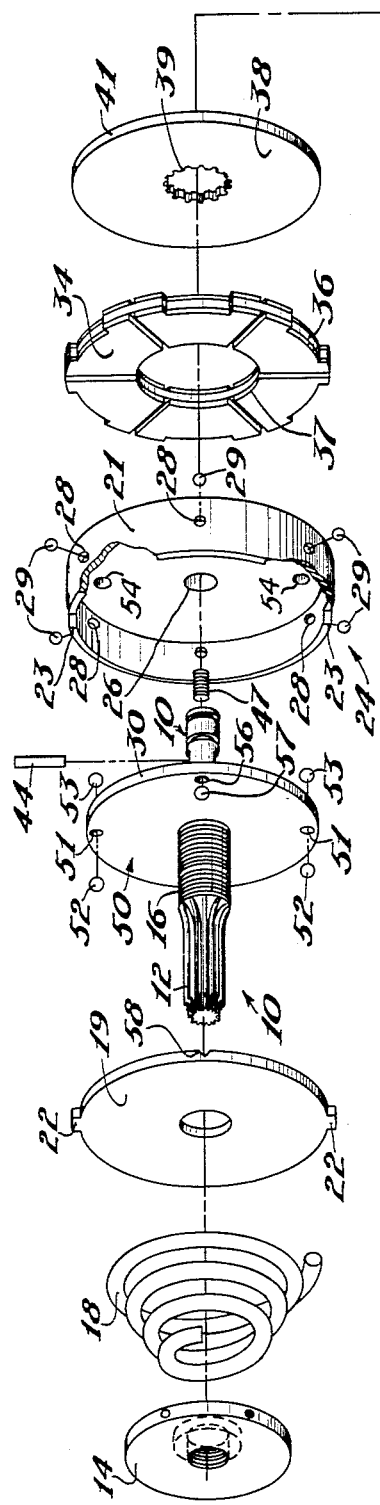
Figure 4 is an exploded perspective view of this embodiment.
Figure 4:
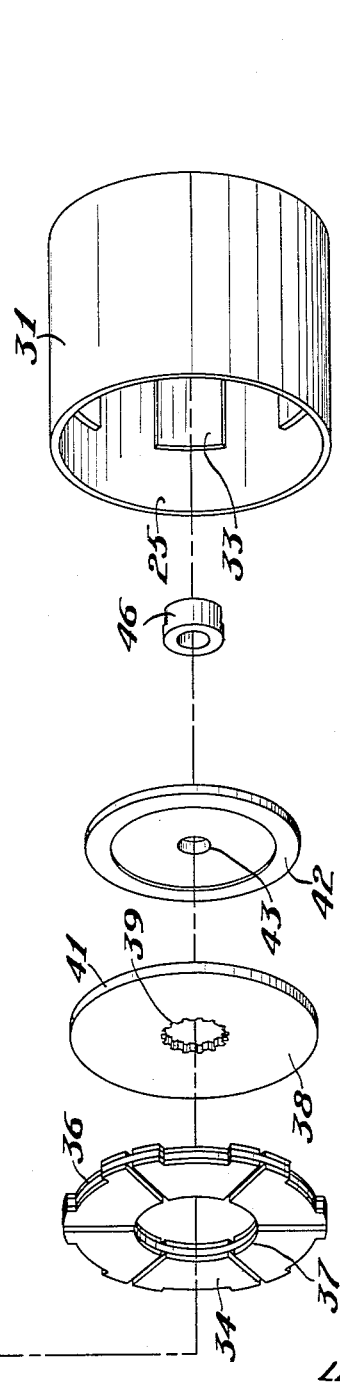
Figure 5:
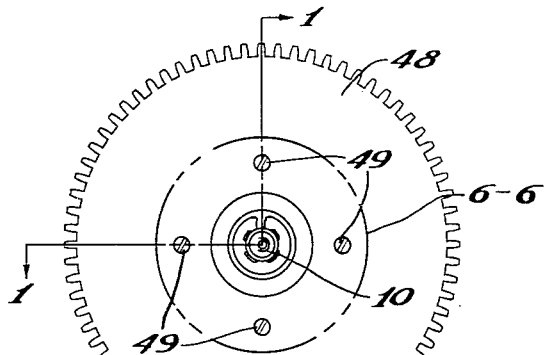
Figure 5 is an end elevational view of this embodiment.
Figure 9:
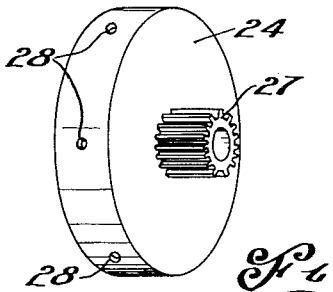
Figure 9 is a perspective view of a part used in the chosen embodiment.

Now referring to the invention in more detail, Figure 1 shows an output shaft 10 which has a splined portion 12 that receives an internally splined output gear 11 which is mounted on shaft 10 by a set screw 13. A flange 14 (see Figure 4) is threadedly received on threaded portion 16 of shaft 10 and compresses a spring 18 against a toothed washer 19 which slidably and rotatably fits over threaded portion 16. Washer 19 (also see Figure 2) has a pair of diametrically arranged projections or teeth 22 which engage the notches 23 in the outer portion 21 of a hub 24 that has an externally splined sleeve portion 27 (see Figure 9) and is rotatably received on smooth portion 26 of shaft 10.

A number of ball bearing holes 28 are radially disposed through the outer portion 21 of hub 24. A ball bearing 29 is held in each hole 28 by an outer raceway 25, provided by the inner surface of an input shell 31, and by an inner raceway 30, provided by the outer surface of an output disc 50.

Input shell 31 is rotatably received on shaft 10 and has an inner splined portion 33 which receives the splined periphery 36 of a pair of friction discs 34 that have large center openings 37 which fit over but do not engage hub splined sleeve portion 27. A pair of friction plates 38 have splined center holes 39, which mate with splined sleeve portion 27 of hub 24, and have smooth peripheries 41 which do not engage inner splined portion 33 of input shell 31.

A ring bearing 42 is slidably and rotatably received on shaft 10 against a thrust bearing 46 which is fixed to shaft 10 by a pin 44. The end friction plate 38 thrusts against ring bearing 42. Pin 44 is transversely received through bearing 46 and through a longitudinally elongated transverse slot 43 in shaft 10. It is locked in position by a set screw 47 threadedly received in shaft 10. An input gear 48 is fixed to input shell 31 by fastening means 49.

Output disc 50 is fixed to shaft 10 and has a pair of longitudinally bored diametrically opposed ball bearing holes 51. A pair of ball bearings 52 and 53 are supported in each hole 51 and bearings 52 engage the flat surface of washer 19, and ball bearings 53 engage a cone-shaped ball bearing socket 54 in hub 24. Another pair of diametrically opposed ball bearings 57 are each received between a cone-shaped socket or indentation 56 in output disc 50 and a V-shaped groove 58 in toothed washer 19. The vertex angle of each cone-shaped socket 56 equals the vertex angle of groove 58, but those angles are smaller than the vertex angle of cone-shaped socket 54.

It will be observed that the input gear 48 is always fixed to input shell 31, and that shell 31 is always rotationally fixed to friction discs 34 by their splined connection. Items 48, 31 and 34 are designated as unit 60. It will be further noted that hub 24 is always rotationally fixed to friction plates 38 by their splined connection on hub portion 27. Items 24, 27 and 38 are designated as unit 61. The only coupling between input unit 60 and output unit 61 is frictional between the contacting surfaces of discs 34 and plates 38. Toothed washer 19 is rotatably fixed (except for a predetermined amount of lost motion) but is not longitudinally fixed to hub 24 by means of teeth 22 and notches 23.

Figure 6:
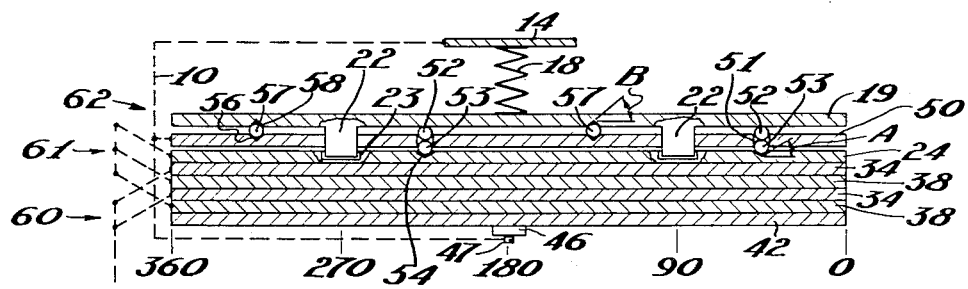
Figure 6 is an unwrapped cylindrical sectional view of section 6—6 of Figure 5 looking radially inwardly.

Figure 6 is used to more clearly describe the operation of this invention. Figure 6 is obtained by passing a cylindrical surface longitudinally through the center of ball bearings 52, 53 and 57 and then by unwrapping the cylindrical surface into a plane surface.

Angular designations from zero to 360 degrees are provided to give angular perspective to the unwrapped cylindrical surface. To obtain operational clarity, teeth 22 and notches 23 are shown out of proportion in Figure 6.

The items which are always rotationally fixed are connected in Figure 6 by dashed lines. They are unit 60, unit 61, and output shaft 10 with its attached parts. Bearings 52, 53 and 57, cone-shaped sockets 54 and 56, washer 19, and teeth 22 with notches 23 are designated as torque limiting unit 62.

Figure 6 indicates the position of the items before any torque is applied between input gear 48 and output gear 11. Ball bearings 57 are then loosely held in their sockets, and spring 18 presses its force against toothed washer 19 which in turn entirely distributes that force through ball bearings 52 and 53 to hub 24, clutch surfaces 34 and 38, end ring 42, and thrust bearing 46.

The compression force on spring 18 is initially adjusted by means of threaded flange 14 so that sufficient force is exerted on the clutch members. The pressure on the plates is adjusted so that it is sufficiently large that no slippage can occur below the limiting torque when the coefficient of friction is at a minimum value.

A small amount of lateral backlash or lost motion exists between each tooth 22 and notch 23 and between each ball bearing 57 and groove 58 (see Figure 6). The lost motion between teeth 22 and notches 23 is made very small and remains constant while the lost motion between ball bearings 57 and grooves 58 is adjustable. The total lost motion between units 60 and 61, on the one hand, and output shaft 10, on the other hand, is the sum of these lost motions, and the limiting torque is determined by adjusting the amount of lost motion, as is explained below.

Ball bearings 53 are a torque transmission link between units 60 and 61, on the one hand, and output shaft 10, on the other hand. A torque applied to input gear 48 is first transferred as a shearing force through the frictional coupling between units 60 and 61 which are both rotatable on shaft 10. Then hub 24 with its cone-shaped bearing sockets 54 laterally moves against bearings 53 that are laterally supported in output disc 50 by the walls of holes 51 and the torque is thereby transferred through disc 50 and shaft 10 to output gear 11.

The walls of cone-shaped sockets 54 slope at an angle or incline A with respect to the direction of the shearing force caused by the torque (see Figure 6) and the force resolves itself into a transverse component and a longitudinal component which are exerted on bearing 53. The transverse component is the shearing force caused by the torque and is transmitted through bearings 53 to disc 50. The longitudinal force component operates against the opposing longitudinal force of spring 18 and is transmitted through bearings 52 and 53.

A torque much smaller than the limiting torque causes a small longitudinal force component which is not large enough to overcome the opposing force of spring 18. Bearings 53 then remain in the bottom of socket 54 while the small torque is being transmitted by the transverse force component.

A torque slightly less than the limiting torque causes a longitudinal force component on bearings 53 sufficient to overcome the opposing spring longitudinal force, and simultaneously bearings 53 begin to move up inclines A of sockets 54. Hence, hub 24 and its cone-shaped sockets 54 start to rotate relative to output disc 50. Bearings 53 then push ball bearings 52 and washer 19 upwardly to further compress spring 18. A position of stability is ultimately reached by each ball bearing 53 at a higher point on each incline A when the increased force of spring 18 equals the opposing longitudinal force component caused by the torque, and sockets 54 then stop rotating relative to disc 50. The torque is still transmitted through bearings 53 to disc 50 by means of the transverse force component.

Figure 7:
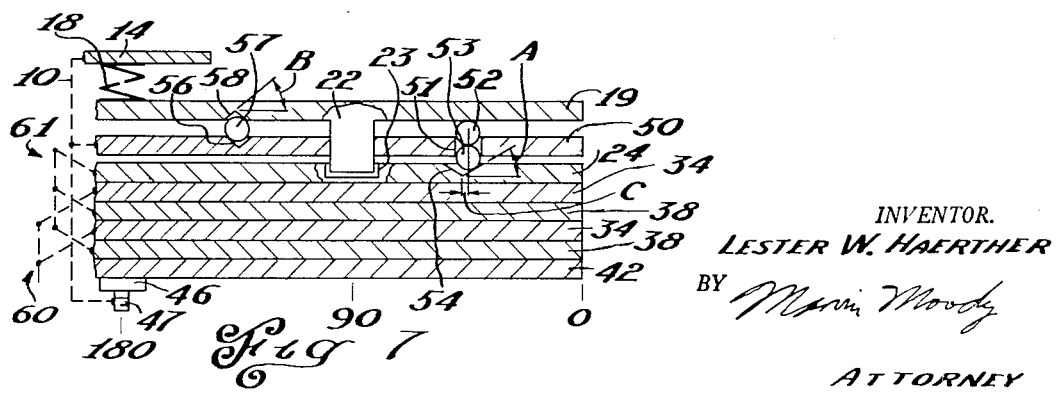
Figure 7 shows a portion of Figure 6 when the limiting torque is exceeded.

Now let a still larger torque be applied which exceeds the desired limiting torque. The longitudinal force component again becomes greater than the existing spring force, and the position of bearings 53 on inclines A is again unstable. Bearings 53 again begin to move up inclines A while sockets 54 again begin to rotate relative to output disc 50. The lateral lost motion between each tooth 22 and notch 23 is overcome, so that toothed washer 19 begins to rotate with hub 24 and socket 54 relative to disc 50. Very soon the lost motion between each bearing 57 and grooves 56 and 58 is also overcome until a side of groove 58 is squarely pressed against bearing 57 which is shown in Figure 7. The torque is now transmitted to disc 50 partly by the transverse force component on bearings 57 as well as by the remaining transverse force component on bearings 53.

Grooves 58 slope at an angle or incline B with the direction of the shearing force, and angle B is greater than angle A. A further small amount of rotation of washer 19 with its grooves 58 relative to disc 50 would cause washer 19 to be moved longitudinally by incline B rather than by incline A because of the greater incline of grooves 58. There is now a longitudinal force component on bearings 57 between washer 19 and fixed disc 50. The force operates against the longitudinal force of spring 18. The spring force which previously was totally applied to hub 24 through bearings 52 and 53 now is applied in part to fixed disc 50 through bearing 57. Hence, the component of spring force applied to bearings 57 presses against output disc 50 which is fixed to shaft 10 and does not press against the clutch plates. Therefore as the spring force is taken from hub 24 and given to fixed disc 50, the force on the clutch is decreased until it begins to slip.

Figure 8:
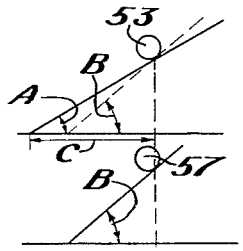
Figure 8 is a geometrical operational diagram.

It is noted that the slippage point is reached as soon as all lateral lost motion is overcome, and grooves 58 are brought squarely against bearings 57. Therefore by controlling the amount of lost motion, the clutch slippage point is controlled, and thereby the limiting torque is controlled. Figure 8 shows the geometrical relationship between the amount of lost motion and the angle of inclines A and B, and shows how bearings 57 take over when the lost motion is overcome. The lost motion is designated as C in Figure 8.

As long as the torque on input gear 48 is greater than the preset limiting torque, clutch slippage continues regardless of the coefficient of friction. Therefore the output torque from gear 11 can never exceed a preset torque limit.

The limiting torque is controlled by these factors: The amount of lost motion, the initial force of spring 18 on washer 19, the spring constant of spring 18, and the angles of inclines A and B. The angles A and B are fixed by machine cutting, and the spring constant is fixed once spring 18 is chosen. However, the initial force of spring 18 can be adjusted by screwing flange 14 tighter or looser as desired. The amount of lost motion of bearings 57 can be adjusted by screwing set screw 47 which longitudinally moves thrust bearing 46 and units 60 and 61 and pushes bearings 53 and 52 against washer 19. As the space between washer 19 and disc 50 is adjusted, the lost motion between bearing 57 and groove 58 is varied as desired. The limiting torque can therefore be adjusted as desired by set screw 47 regardless of the coefficient of friction of the clutch discs. As wear occurs between the clutch discs, set screw 47 can be adjusted to take up the wear.

Ball bearings 29 are, on the other hand, conventional antifriction bearings and maintain longitudinal alignment between input shell 31, hub 24, and output shaft 10 at all times.

While a specific embodiment has been disclosed, it is understood that this invention is capable of a great many modifications of its details by any one skilled in the art and therefore various changes, modifications and arrangements may be resorted to within the scope of the appended claims.

I claim:

1. A torque limiting device comprising, a shaft, an output gear non-rotatably attached to one end of said shaft, a flange threadedly received on said shaft adjacent said output gear, a spring received around said shaft and in engagement with said flange, a toothed washer slideably and rotatably supported on said shaft adjacent the other side of said spring and formed with a plurality of teeth on its periphery and a plurality of radial grooves on the surface opposite said spring, an output disc rigidly attached to said shaft adjacent said toothed washer and formed with a plurality of longitudinal openings symmetrically located near its periphery, a hub slideably and rotatably supported on said shaft adjacent said disc and formed with notches loosely engaged by said teeth, a splined sleeve portion axially attached to said hub on its side opposite said disc, a plurality of ball bearings received in the openings formed through the output disc, said hub formed with a plurality of ball bearing sockets engaged by the adjacent ball bearings supported in the disc openings, friction discs received over said splined sleeve, friction plates splinedly received on said splined sleeve, a clutch formed by alternately interleaving the friction discs and friction plates and having one end adjacent said hub and the other end opposite said hub, an internally splined input shell splinedly engaging said friction disc, an input gear connected to said input shell to drive it, a ball bearing supported between each groove in said washer and adjacent socket in said disc, and thrust support means fixed adjustably to said shaft and engaging the end of said clutch opposite said hub.

2. A torque limiting device comprising, an output shaft with an output gear nonrotatably supported on said shaft, a flange threadedly received on said shaft, a spring axially mounted on said shaft in engagement with said flange, a toothed washer slideably and rotatably supported on said shaft in engagement with the other end of said spring and formed with a pair of grooves on the side opposite said spring, an output disc fixed rigidly to said shaft and formed with a plurality of longitudinal openings through it and a plurality of cone shaped sockets on the side adjacent said toothed washer, a splined friction hub slideably and rotatably supported on said output shaft and formed with notches loosely engaged by the teeth of said toothed washer, said hub formed with a plurality of ball bearing sockets respectively adjacent the openings of said output disc, a plurality of ball bearings received in the openings formed in said output disc with two ball bearings slideably received in each opening and with one of each of these two ball bearings receivable in each ball bearing socket formed in the friction hub, a second plurality of ball bearings each received in each cone-shaped socket formed in the output disc and respectively engageable in the grooves formed in the toothed washer, an input shell formed with a plurality of internal splines, a plurality of friction discs formed with large axial openings that are received nonengageably by the hub, said friction discs formed with projections on their periphery that are received within the splines of the input shell, a plurality of friction plates slideably but nonrotatably attached to the splined hub, a clutch formed by mounting the friction discs adjacent to the friction plates, an input gear attached to said input shell, thrust bearing means supported on said shaft against said clutch, said disc sockets and said washer grooves formed with inclines that are equal, and the sockets in said disc formed with larger inclines than the sockets in said hub.

3. A torque limiting device comprising, an output shaft with an output gear nonrotatably supported on said shaft, a flange fixed adjustably on said shaft, a spring axially mounted on said shaft in engagement with said flange, a toothed washer slideably and rotatably supported on said shaft in engagement with the other side of said spring and formed with a pair of grooves on the face opposite said spring and a plurality of teeth symmetrically fixed to its periphery, an output disc transversely fixed rigidly to said shaft and formed symmetrically with a plurality of openings through it and a plurality of cone-shaped sockets on the side adjacent said toothed washer, a splined friction hub slideably and rotatably supported on said output shaft adjacent said disc and formed with notches which loosely engage the teeth of said toothed washer, said friction hub formed with a plurality of ball bearing sockets in longitudinal alignment with said disc openings respectively, a plurality of ball bearings received in the openings formed in said output disc with two ball bearings slidably received in each opening and with one of these two ball bearings receivable in each of the ball bearing sockets formed in the friction hub, a second plurality of ball bearings received in each cone-shaped socket formed in the output disc and engageable respectively in the grooves formed in the toothed washer, an input shell formed with a plurality of internal splines, a plurality of friction discs formed with large central openings received over said shaft, said friction discs formed with projections that are received within the internal splined portion of the input shell, a plurality of friction plates formed with central splined openings that are splined to said hub and mounted between adjacent friction discs to form a friction clutch, an input gear attached to said input shell, and the vertex angles of said grooves and ball bearing sockets in said disc being smaller than the vertex angle of said sockets in said hub.

4. A torque limiting device comprising, an output shaft, a flange fixed on said shaft, a spring axially mounted on said shaft and engaged at one end by said flange, a toothed washer slidably and rotatably supported on said shaft in engagement with the other end of said spring and formed with a plurality of grooves on its face opposite said spring, an output disc centrally fixed to said shaft and formed symmetrically with a plurality of transverse openings and also formed symmetrically with a plurality of cone shaped sockets on the side adjacent to said washer, a hub rotatably supported on said shaft, a cylindrical portion fastened to the periphery of said hub and rotatably received about the periphery of said disc, said portion formed with a plurality of notches engageable with the teeth of said toothed washer and formed with a plurality of symmetrical holes, said hub formed with a plurality of ball bearing sockets aligned with the holes in said disc respectively, a plurality of ball bearings received in the openings formed in said output disc with two ball bearings in each opening and with one of each of these two ball bearings receivable in the ball bearing sockets formed in the hub, a second plurality of ball bearings received between the adjacent cone-shaped sockets formed in the output disc and the grooves formed in the toothed washer respectively, an input shell rotatably supported about the cylindrical portion of said hub and formed with a plurality of internal splines on its remaining internal surface, a third plurality of ball bearings received in the holes of said cylindrical portion respectively between the periphery of the disc and the internal surface of the shell, a plurality of friction discs formed annularly with projections on its outer periphery that engage the internal splined portion of the input shell, a plurality of friction plates formed annularly with a smooth periphery and splined to said hub and mounted between adjacent friction discs, a thrust bearing fixed adjustably to said shaft, a ring bearing formed annularly, and said ring bearing rotatably received over said shaft between said thrust bearing and said adjacent friction plate.

5. A torque limiting device comprising, an output shaft, a flange threadedly received on said shaft, a toothed washer slidably supported on said shaft and formed with a pair of grooves on one face thereof, an output disc fixed to said shaft and formed symmetrically with a plurality of longitudinal openings through it, said output disc formed on one side with a plurality of cone-shaped sockets, said washer spring biased toward said disc with their grooves and sockets aligned respectively, a hub formed with a plurality of notches engageable loosely with the teeth of said toothed washer and slideably and rotatably supported on said output shaft, said hub formed with a plurality of ball bearing sockets adjacent to and aligned with the openings through said disc, a first plurality of ball bearings received in the openings formed in said output disc with at least one ball bearing in each opening, said first plurality of ball bearings engaged on one side by the ball bearing sockets formed in the hub and on the other side by the flat face of the washer, a second plurality of ball bearings with each bearing engaged on one side by the cone-shaped socket formed in the output disc and engaged on the other side by the grooves formed in the toothed washer, an input shell formed internally with a plurality of splines, a friction clutch received on said shaft with alternate friction discs formed with projections on the outer periphery that engage the internal splined portion of the input shell, the other alternate friction plates of said clutch splined to said hub, and thrust means supported by said shaft and engaging the side of said clutch opposite said disc.

6. A torque limiting device comprising, an output shaft, an output gear nonrotatably supported on said shaft, a flange threadedly received on said shaft, a spring axially mounted on said shaft in engagement with said flange, a toothed washer slideably supported on said shaft in engagement with said spring and formed with a pair of grooves on one face thereof, an output disc fixed to said shaft and formed symmetrically with a plurality of openings through it, said output disc also formed with a plurality of cone-shaped sockets on its side adjacent said toothed washer, a hub formed with a plurality of notches engageable loosely with the teeth of said toothed washer and rotatably supported on said output shaft, said hub formed with a plurality of ball bearing sockets on its side adjacent said disc, a first plurality of ball bearings received in the openings formed in said output disc bordered at one end by the flat surface of said washer and bordered on the other side by the ball bearing sockets formed in the friction hub, a second plurality of ball bearings with each bordered on one side by one of the cone-shaped sockets formed in the output disc and bordered on the other side by the grooves formed in the toothed washer, an input shell formed internally with a plurality of splines, a plurality of annular friction discs formed with projections that are received within the splined portion of the input shell, a plurality of annular friction plates splined to the hub and mounted alternately with the friction discs, an input gear attached to said input shell, and the inclines of said grooves and sockets being greater for the sockets in the disc and the grooves in the washer than for the sockets in the hub.

7. A torque limiting device that permits a friction coupled portion to disengage at a preset limiting torque in a manner that is independent of its coefficient of friction comprising, a shaft, a disc member fixed axially on said shaft at an intermediate point, a threaded portion formed on said shaft adjacent said disc member, a washer formed annularly with a plurality of teeth projecting from its outer periphery, said washer slideably received over said threaded portion of said shaft, spring means slideably received over said threaded portion against said washer, a flanged member threadedly received over said threaded portion of said shaft to bias said spring toward said washer, a hub member slideably received on said shaft adjacent to but on the opposite side of said disc member from said threaded portion, an outer portion formed about the periphery of said hub, said outer portion formed with notches which engage said teeth of said washer with a predetermined amount of backlash, a sleeve portion formed axially on said hub on its side opposite said disc member, said sleeve portion slideably and rotatably received on said shaft and formed with a spline on its outer surface, a plurality of friction plates annularly formed with splined inner openings which are received over said sleeve portion of said hub, a plurality of friction discs annularly formed with smooth inner openings and a splined periphery, said friction discs slideably received over said splined sleeve and alternately received among said friction plates, bearing means supported by said shaft and engaging the adjacent friction plate, a cylindrical shell formed with a splined internal surface which engages the splined periphery of said friction discs, the face of said washer adjacent said disc formed with a pair of radial grooves that are diametrically aligned, a pair of cone-shaped sockets formed in the face of said disc adjacent said washer, said first pair of sockets longitudinally aligned with said grooves respectively, a pair of holes formed longitudinally through said disc, said holes located diametrically opposite each other in said disc, a pair of cone-shaped sockets formed on the side of said hub adjacent said disc and aligned with said pair of openings respectively in said disc, a first pair of ball bearings received between said pair of grooves in said washer and said adjacent sockets in said disc respectively with a predetermined amount of backlash, a second pair of ball bearings received in one of the openings through said disc, a third pair of ball bearings received in the other of said openings through said disc, said second and third pair of bearings supported on one side of said openings by the adjacent flat surface of said washer and supported on the other side of said disc by the respective sockets in said hub, and the apex angles of said cone-shaped sockets of said hub formed greater than the apex angles of the sockets in said disc and the solid angle of said grooves.

8. A torque limiting means utilizing a friction clutch in a manner that makes its slippage point independent of its coefficient of friction comprising, a shaft, an annular disc fixed transversely to said shaft, a flange member mounted fixedly on said shaft, an annular washer supported slideably on said shaft between said disc and said flange, a spring member supported between said flange and said washer to bias said washer against said disc, a hub member slideably supported on said shaft adjacent to the side of said disc opposite from said washer, one set of alternate plates of said clutch mounted on said hub, said one set rotationally fixed on said hub and axially slideable on said hub, a shell member supported about said clutch, the other set of alternate plates of said clutch fixed rotationally to said shell and axially slideable in said shell, thrust bearing means fastened to said shaft and engaging said clutch on its side opposite said spring, said disc formed with a plurality of holes through it, said hub formed with a plurality of angular indentations with each indentation aligned with one of said disc openings, a plurality of bearings received in each of said disc openings and engaging said washer on one side and said hub indentations on the other side, said disc also formed with a plurality of angular indentations on its side adjacent said washer, said washer formed with a plurality of angular indentations adjacent said disc indentations, a separate bearing supported between each washer indentation and the adjacent disc indentation, a plurality of teeth fixed to said washer, said hub formed with a plurality of notches that are engaged by said washer teeth with backlash, and said indentations in said disc and said washer formed with a larger incline than said indentations in said hub.

9. A torque limiting means comprising, a shaft, an annular disc fixed transversely to said shaft, a hub slideably received on said shaft adjacent said disc, a sleeve portion fixed to said hub and extending axially away from said disc, a friction clutch received on said sleeve portion, one set of alternate plates of said clutch splined to said sleeve portion, a shell received about said clutch and splined to the other set of alternate clutch plates, a washer slideably received on said shaft, spring means biasing said washer toward said disc to apply pressure to said clutch plates, a plurality of teeth extending from said washer toward said hub, said hub formed with a plurality of openings to receive said teeth with backlash, said disc formed with a plurality of openings through it, an angular indentation formed in said hub adjacent each opening in said disc, first bearing means received in each disc opening, said spring means biasing said first bearing means against the indentations in said hub, said disc also formed with a plurality of angular indentations, second bearing means provided from said washer and engaging said indentations in said disc, and said indentations in said disc formed with smaller vertex angles than the indentations in said hub.

10. A torque limiting means comprising, a shaft, a disc fixed transversely to said shaft, a clutch with alternate driving and driven plate members supported axially on said shaft, an annularly formed hub supported slideably and rotatably on said shaft between said disc and clutch, said driven plate members of said clutch splined to said hub, a shell member received about said clutch, said driving plate members splined to said shell member, a washer mounted slideably and rotatably on said shaft, spring means biasing said washer toward said disc, a plurality of teeth projecting from said washer, said hub formed with a plurality of notches engaged loosely by said teeth, a plurality of openings formed through said disc, a plurality of angular indentations formed in the side of said disc adjacent washer, a plurality of angular indentations formed in said hub with each indentation aligned with one of said openings in said disc, a plurality of first bearing means supported in said disc openings and extending on both sides of said disc, a plurality of second bearing means provided from said washer and engaging the angular indentations in said disc, the angular indentations in said disc formed with smaller apex angles than the indentations in said hub.

11. A torque limiting means for releasing a friction clutch independently of the coefficient of friction of the frictionally engaged plates of the clutch comprising, a shaft axially received through said clutch, thrust bearing means fixed to said shaft and engaging one end of said clutch, disc means fixed to said shaft on the other side of said clutch from said thrust bearing means, hub means supported slideably and rotatably on said shaft between the clutch and disc means and formed with a plurality of notches, alternate plates of said clutch splined to said hub means, shell means splined to said remaining alternate clutch plates, washer means slideably and rotatably supported on said shaft, a plurality of projections fixed to said washer means and loosely engaging the notches in said hub means, said disc means formed with a plurality of holes symmetrically arranged, said hub means formed with a plurality of angular indentations symmetrically placed adjacent to the holes in said disc means, said disc means also formed with a plurality of angular indentations symmetrically interspersed among the holes on the side adjacent said washer means, a plurality of first bearing means engaged by said washer means and engaging said indentations in said disc means, a plurality of second bearing means supported in the holes in said disc means and engaging the indentations in said hub means, spring means biasing said second bearing means into the indentations on said hub means, and the apex angle of the indentations in said disc means formed smaller than the apex angle of the indentations in said hub means.

12. A torque limiting means for releasing a friction clutch independently of the coefficient of friction of the frictionally engaged plates of the clutch comprising, a shaft axially received through said clutch, thrust bearing means supported by said shaft and engaging one end of said clutch, disc means fixed to said shaft on the other side of said clutch from said thrust bearing means, hub means supported slideably and rotatably on said shaft between said clutch and said disc means and formed with a plurality of notches, alternate plates of said clutch splined to said hub means, shell means splined to said remaining alternate clutch plates, washer means slideably and rotatably supported on said shaft, a plurality of projections fixed to said washer means and loosely engaging the notches in said hub means, said disc means formed with a plurality of holes symmetrically arranged, said hub means formed with a plurality of angular indentations radially and symmetrically placed adjacent to the holes in said disc means, said washer means formed with a plurality of angular indentations adjacent to said disc means and symmetrically interspersed in relation to the holes in said disc means, a plurality of first bearing means supported between said disc means and the indentations of said washer means, a plurality of second bearing means supported in the holes in said disc means and engaging the indentations in said hub means, spring means biasing said second bearing means into the indentations in said hub means, and the apex angle of the indentations in said washer means formed smaller than the apex angle of the indentations in said hub means.

13. A device for releasing a friction clutch at a predetermined torque regardless of variation in the coefficient of friction of the friction elements of said clutch comprising, a shaft received axially through said clutch, bearing means supported adjustably by said shaft and engaging one end of said clutch, means for receiving rotary power splined to alternate plates in said clutch, hub means slideably and rotatably mounted on said shaft adjacent the other end of said clutch, the remaining discs in said clutch splined to said hub means, a disc fixed rigidly to said shaft adjacent to said hub, said disc formed symmetrically with a plurality of openings through it, said hub means formed with a plurality of angular notches adjacent said disc openings, washer means slideably mounted on said shaft adjacent said disc, a first plurality of bearings received in the openings of said disc engaging the flat surface of said disc on one side and engaging the notches in said hub on the other side, a second plurality of bearings received between said disc means and said washer means in angular notches formed respectively in said disc and washer means, the notches in said hub formed with smaller inclines than the notches in said washer means and disc means, and biasing means applied to said washer means to force it toward said clutch with a force sufficient to prevent said clutch from slipping with its minimum coefficient of friction below the limiting torque.

References Cited in the file of this patent
UNITED STATES PATENTS
1,739,947 Chilton Dec. 17, 1929